United States Patent
Gillblad

(10) Patent No.: US 10,017,317 B2
(45) Date of Patent: Jul. 10, 2018

(54) FOOD PACKAGE AND METHOD FOR TRANSFER OF FOOD

(75) Inventor: Rickard Gillblad, Onsala (SE)

(73) Assignee: Torus Pak Research and Development S.A.R.L., Luxembourg (LU)

( * ) Notice: Subject to any disclaimer, the term of this patent is extended or adjusted under 35 U.S.C. 154(b) by 1421 days.

(21) Appl. No.: 11/919,394

(22) PCT Filed: Apr. 28, 2006

(86) PCT No.: PCT/SE2006/000508
§ 371 (c)(1),
(2), (4) Date: Oct. 26, 2007

(87) PCT Pub. No.: WO2006/115457
PCT Pub. Date: Nov. 2, 2006

(65) Prior Publication Data
US 2009/0304877 A1    Dec. 10, 2009

(30) Foreign Application Priority Data

Apr. 28, 2005    (SE) .................................... 0500948
Oct. 4, 2005    (SE) .................................... 0502182

(51) Int. Cl.
*B65D 81/32*    (2006.01)
*B65D 81/34*    (2006.01)
(Continued)

(52) U.S. Cl.
CPC ............ *B65D 81/3294* (2013.01); *A23L 5/10* (2016.08); *A23P 10/10* (2016.08); *B65D 81/343* (2013.01);
(Continued)

(58) Field of Classification Search
USPC ........................................................ 426/393
See application file for complete search history.

(56) References Cited

U.S. PATENT DOCUMENTS 1,514,379 A    11/1924    Fleischer
2,703,287 A    3/1955    Peters
(Continued)

FOREIGN PATENT DOCUMENTS

CA    2426739 A1 *    10/2003    ............. B65D 25/38
CN    1826272 A    8/2006
(Continued)

OTHER PUBLICATIONS

"Safe Microwave Cooking". Available online from SDbest.com as of Feb. 6, 2004. pp. 1-2.*
(Continued)

*Primary Examiner* — Jenna A Watts
(74) *Attorney, Agent, or Firm* — Brown Rudnick LLP

(57) ABSTRACT

The invention relates to a bottom part intended to receive food thereon, and a container part where the bottom part and the container part are intended to enclose the food. The package is provided with means to hold the bottom part and the container part together in a detachable fashion and means to separate the bottom part from the container part fully or partially. Separating takes the form of removing the bottom part with the bottom part of the package standing in an essentially horizontal position on a serving surface so that the food is so arranged as to come into contact with the serving surface, as a consequence of which the container part is essentially retained it its position enclosing the food. The invention also relates to a method for transferring food from a package to a serving surface.

16 Claims, 21 Drawing Sheets

(51) Int. Cl.
*A23P 10/10* (2016.01)
*A23L 5/10* (2016.01)
*B65D 65/46* (2006.01)

(52) U.S. Cl.
CPC ..... *B65D 81/3446* (2013.01); *B65D 81/3453* (2013.01); *B65D 65/46* (2013.01); *B65D 65/463* (2013.01); *B65D 2581/3432* (2013.01)

(56) References Cited

U.S. PATENT DOCUMENTS

| | | | |
|---|---|---|---|
| 3,179,320 | A | 4/1965 | Ward |
| 3,239,105 | A | 3/1966 | Woodson |
| 3,708,086 | A | 1/1973 | Colato |
| 3,854,023 | A | 12/1974 | Levinson |
| 4,013,798 | A | 3/1977 | Goltsos |
| 4,190,757 | A | 2/1980 | Turpin et al. |
| 4,227,614 | A | 10/1980 | Hollander, Jr. |
| 4,233,325 | A | 11/1980 | Slangan et al. |
| 4,557,377 | A | 12/1985 | Maloney |
| 4,577,080 | A | 3/1986 | Grossman |
| 4,596,713 | A | 6/1986 | Burdette |
| 4,656,042 | A | 4/1987 | Risler |
| 4,687,117 | A | 8/1987 | Terauds |
| 4,933,193 | A | 6/1990 | Fisher |
| 4,942,277 | A | 7/1990 | Narberes |
| 4,965,424 | A | 10/1990 | Bagley |
| 4,992,636 | A * | 2/1991 | Namiki et al. ............... 219/735 |
| 5,052,553 | A | 10/1991 | De Sanctis |
| 5,061,532 | A | 10/1991 | Yamada |
| 5,213,256 | A * | 5/1993 | Cyr ................... 229/120.32 |
| 5,520,940 | A | 5/1996 | Tirkkonen |
| 5,534,282 | A | 7/1996 | Garwood |
| 5,876,811 | A * | 3/1999 | Blackwell et al. .......... 428/34.1 |
| 6,447,825 | B1 | 9/2002 | Korsten |
| 6,579,549 | B1 | 6/2003 | Thrasher et al. |
| 7,205,016 | B2 | 4/2007 | Garwood |
| 7,552,835 | B2 | 6/2009 | Kiel et al. |
| 2002/0197360 | A1 | 12/2002 | Lamp et al. |
| 2006/0068063 | A1 | 3/2006 | Zerfas et al. |
| 2006/0134289 | A1 | 6/2006 | Gustaysson |
| 2009/0304877 | A1 | 12/2009 | Gillblad |
| 2010/0075001 | A1 | 3/2010 | Succar et al. |
| 2012/0305426 | A1 | 12/2012 | Valaie et al. |

FOREIGN PATENT DOCUMENTS

| | | |
|---|---|---|
| CN | 101143634 A | 3/2008 |
| CN | 101166678 A | 4/2008 |
| DE | 1246533 B | 8/1967 |
| DE | 2318670 A1 | 11/1974 |
| EP | 0335478 A2 | 10/1989 |
| EP | 0361893 A2 | 4/1990 |
| EP | 0361893 A2 | 4/1990 |
| EP | 0437082 A1 | 7/1991 |
| EP | 0437082 A1 | 7/1991 |
| EP | 0300809 B1 | 9/1991 |
| EP | 0300809 B1 | 9/1991 |
| EP | 0760341 A1 | 3/1997 |
| EP | 0760341 A1 | 3/1997 |
| EP | 0974531 A1 | 1/2000 |
| EP | 0760341 B1 | 11/2001 |
| EP | 1264781 A1 | 12/2002 |
| EP | 1398278 A1 | 3/2004 |
| EP | 2080713 A1 | 7/2009 |
| EP | 2514684 A1 | 10/2012 |
| FR | 2536251 A1 | 5/1984 |
| GB | 228579 A | 7/1995 |
| GB | 2285791 A * | 7/1995 |
| WO | 1989/003789 A1 | 5/1989 |
| WO | 1990/008710 A1 | 8/1990 |
| WO | 9427868 A2 | 12/1994 |
| WO | 98/17546 A1 | 4/1998 |
| WO | 2004045970 A1 | 6/2004 |
| WO | WO-2004045970 A1 | 6/2004 |
| WO | 2006/102710 A1 | 10/2006 |
| WO | 2006115457 A1 | 11/2006 |
| WO | WO-2006115457 A1 | 11/2006 |
| WO | 2009/136038 A1 | 11/2009 |
| WO | 2011/149421 A1 | 12/2011 |
| WO | 2011/155895 A1 | 12/2011 |
| WO | 2012/002884 A1 | 1/2012 |
| WO | 2015/193401 A1 | 12/2015 |
| WO | 2015/193402 A1 | 12/2015 |
| WO | 2015/193405 A1 | 12/2015 |
| WO | 2016/162546 A1 | 10/2016 |
| WO | 2016/180722 A1 | 11/2016 |

OTHER PUBLICATIONS

PCT Application No. PCT/SE2006/000508, International Search Report dated Jun. 14, 2006, 5 pgs.
"International Application Serial No. PCT/SE2006/000508, Written Opinion dated Jun. 14, 2006", 4 pgs.
Written Opinion issued Jun. 14, 2006 in counterpart PCT Application No. PCT/SE2006/000508.
Supplementary European Search Report issued Aug. 7, 2013 in counterpart EP Application No. EP06733364.
International Search Report received for PCT Patent Application No. PCT/SE2011/050704, dated Sep. 29, 2011, 7 pages.
International Search Report received for PCT Patent Application No. PCT/SE2011/050666, dated Oct. 6, 2011, 6 pages.
Invitation to Pay Additional Fees received for PCT Patent Application No. PCT/SE2011/050666, dated Aug. 17, 2011, 6 pages.
International Preliminary Report on Patentability received for PCT Patent Application No. PCT/SE2011/050666, completed on May 22, 2012, 5 pages.
Extended European Search Report (includes Supplementary European Search Report and Search Opinion) received for European Patent Application No. 11792748.3, dated Jun. 10, 2015, 4 pages.
Extended European Search Report (includes Supplementary European Search Report and Search Opinion) received for European Patent Application No. 11786997.4, dated Jun. 5, 2015, 4 pages.

* cited by examiner

Fig. 3
3a
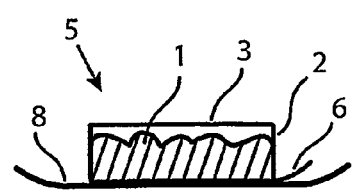
3b
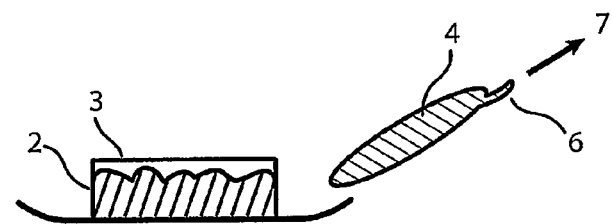
3c
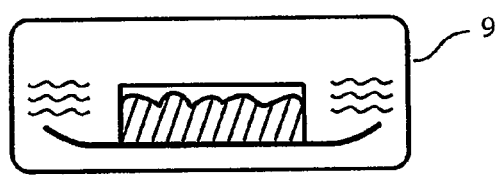
3d
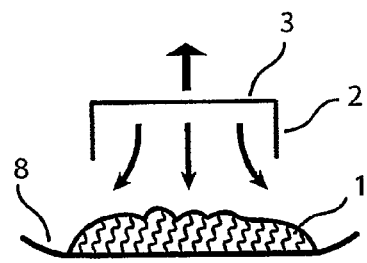

Fig. 4
4a 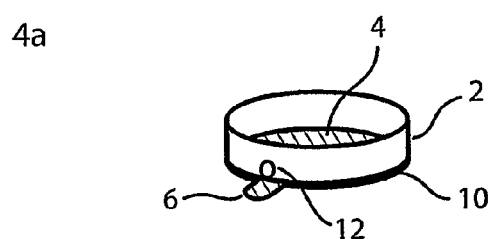
4b 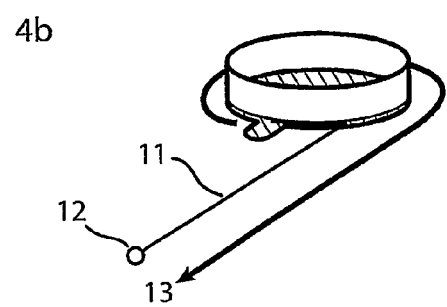
4c 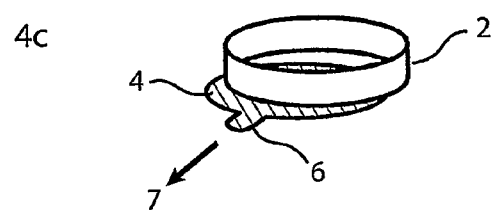

Fig. 6
6a
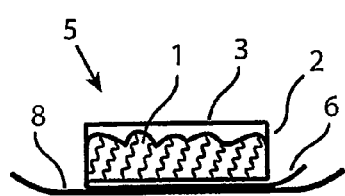
6b
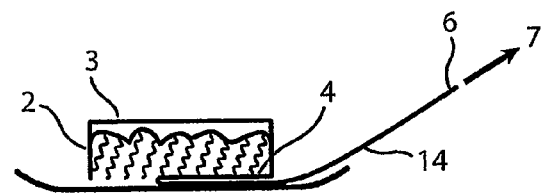
6c
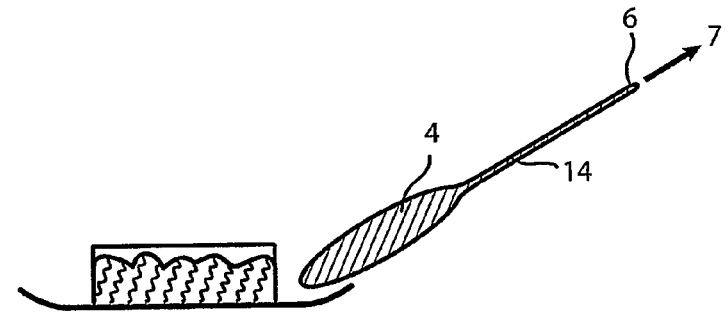

Fig. 7
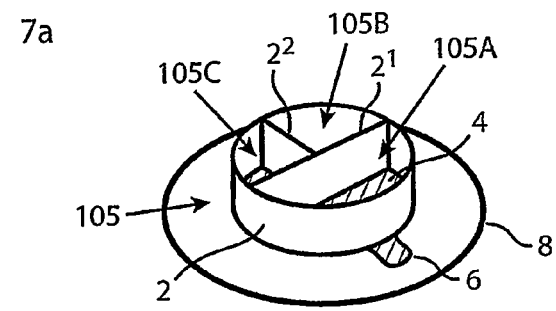
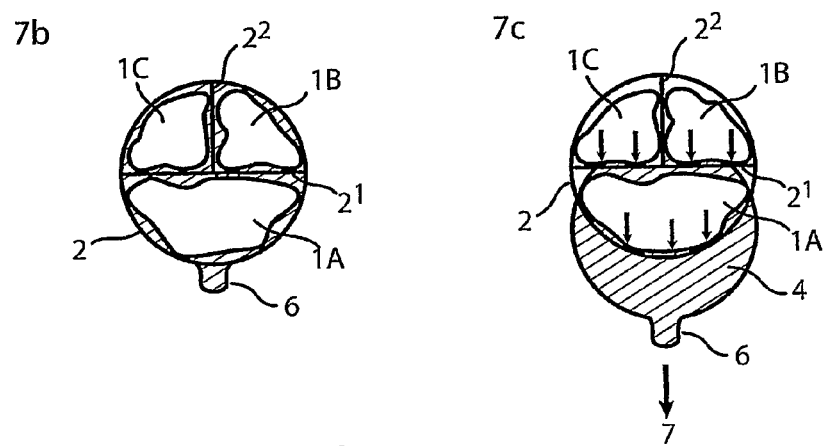
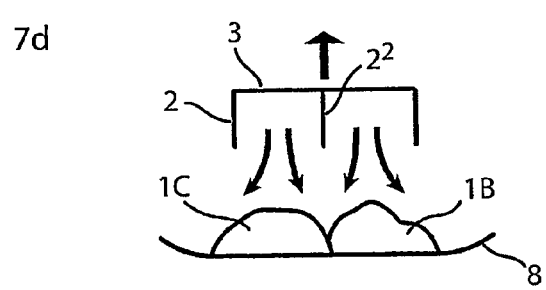
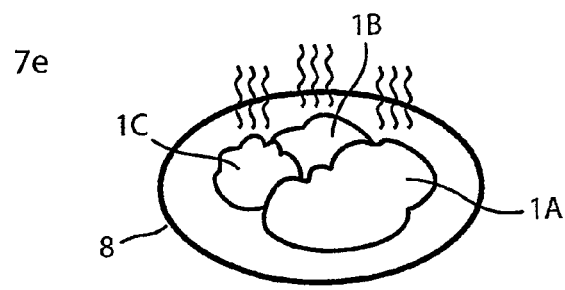

Fig. 9
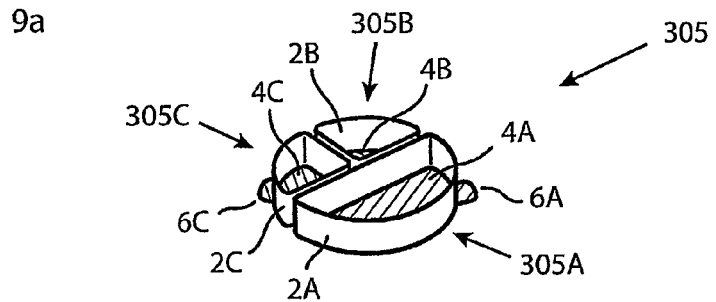
9a
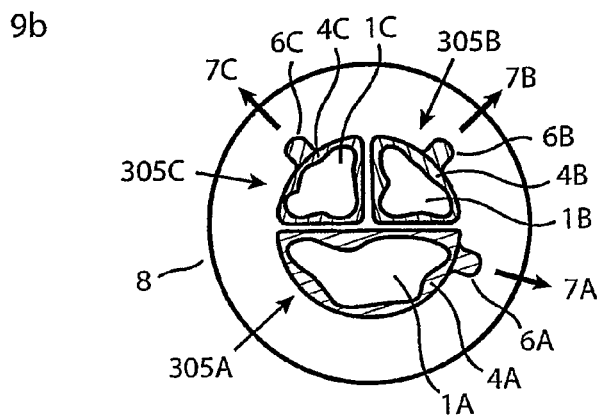
9b
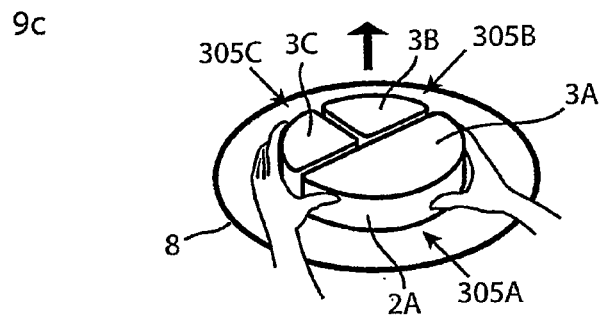
9c
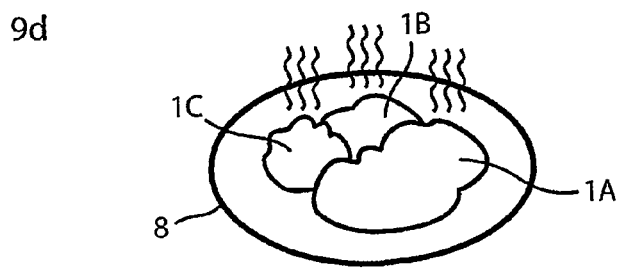
9d

Fig. 10
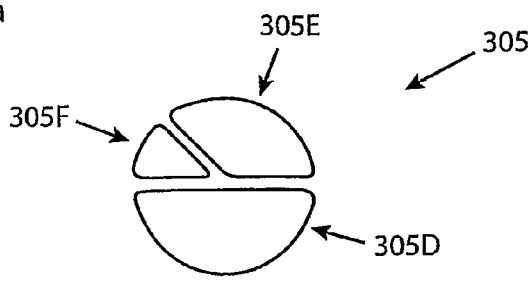
10a
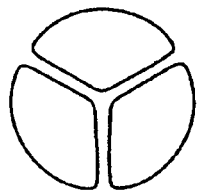
10b
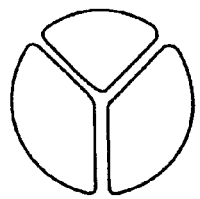
10c
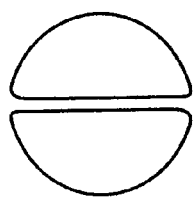
10d
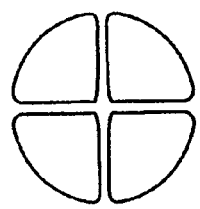
10e Fig. 12
12a 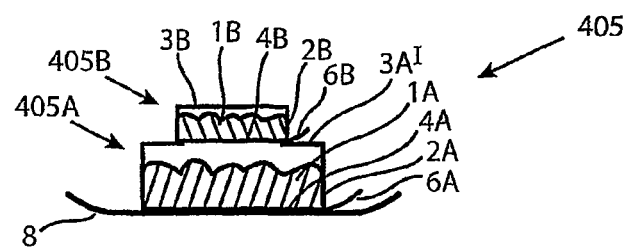
12b 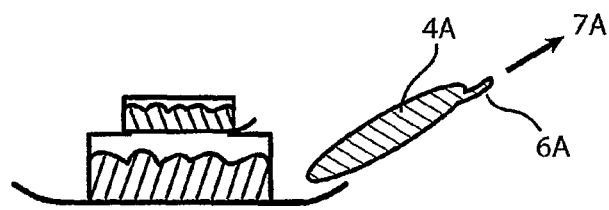
12c 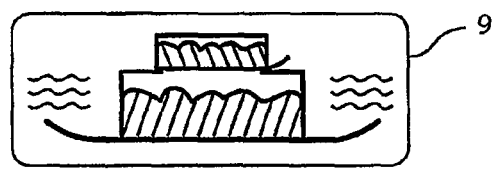
12d 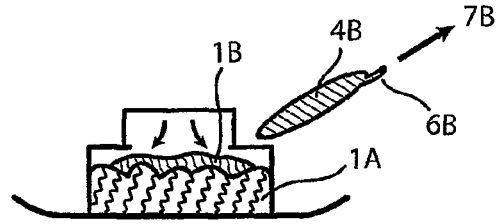
12e 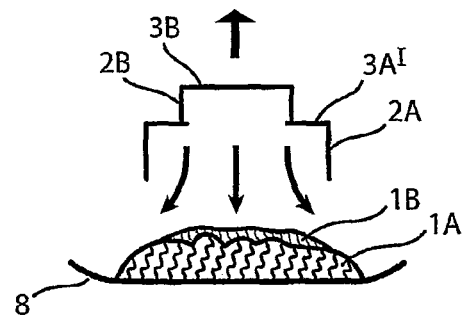

Fig. 13
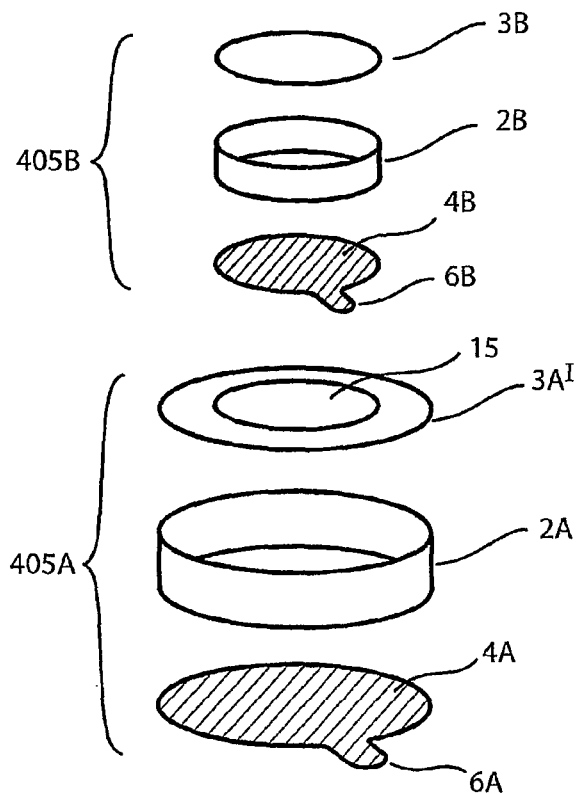
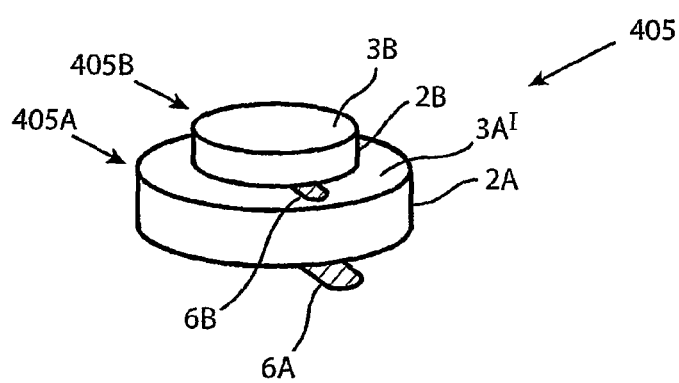

Fig. 15
15a 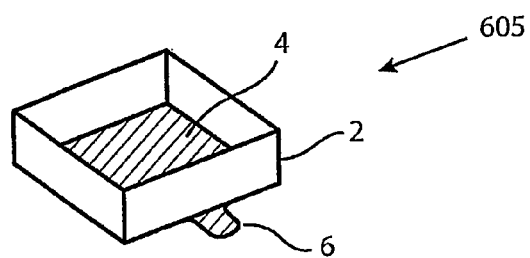
15b 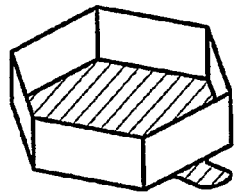
15c 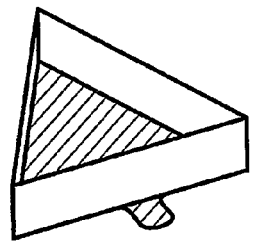

Fig. 16
16a
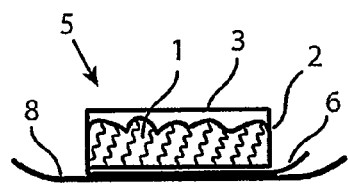
16b
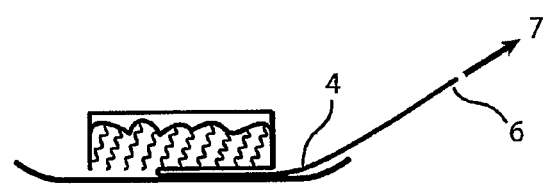
16c
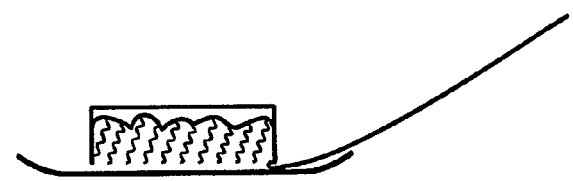
16d
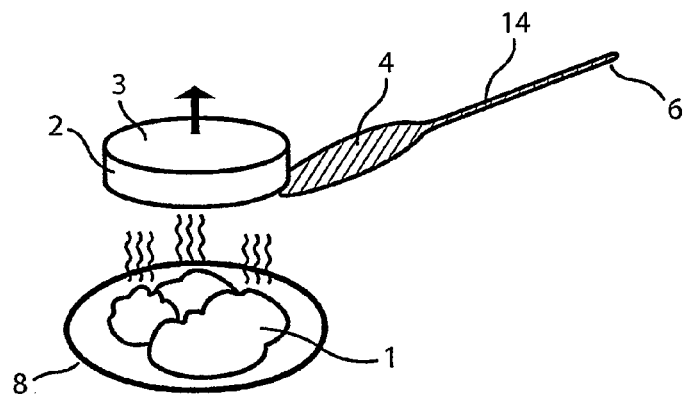

Fig. 18
18a 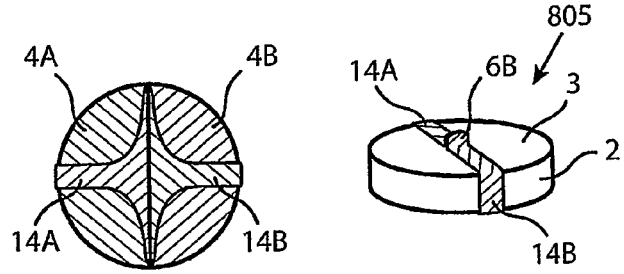
18b 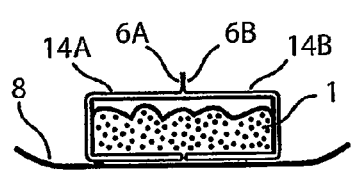
18c 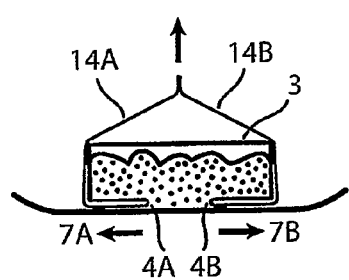
18d 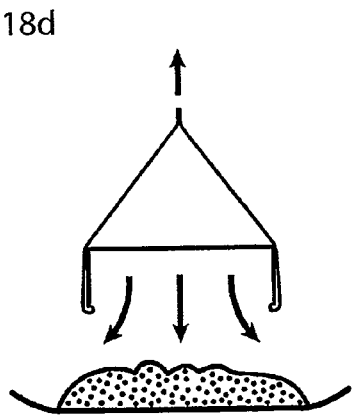
18e 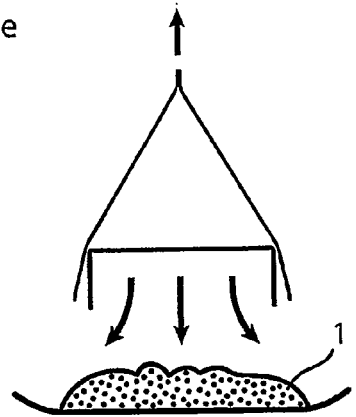

Fig. 19
19a 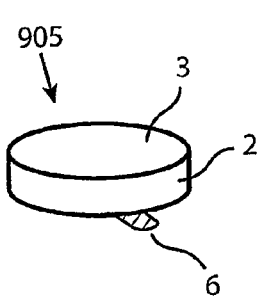 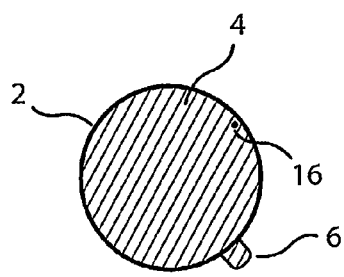
19b 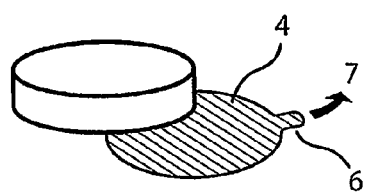 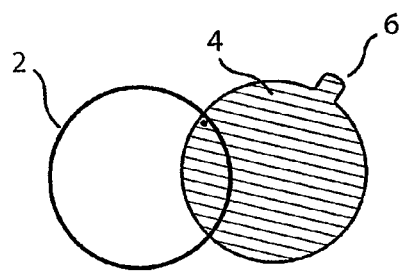
19c 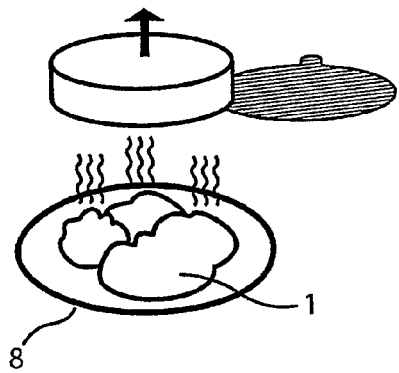 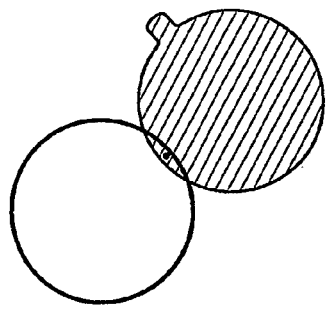

Fig. 20
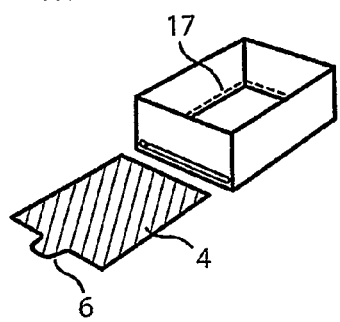
20a
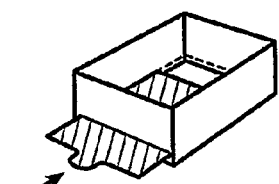
20b
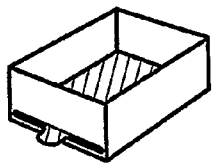
20c
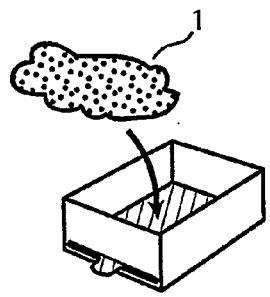
20d
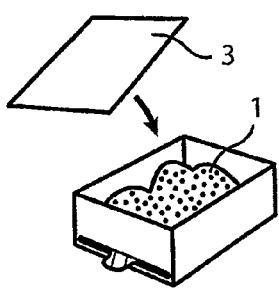
20e
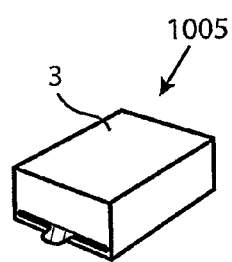
20f
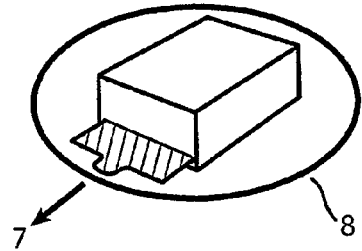
20g
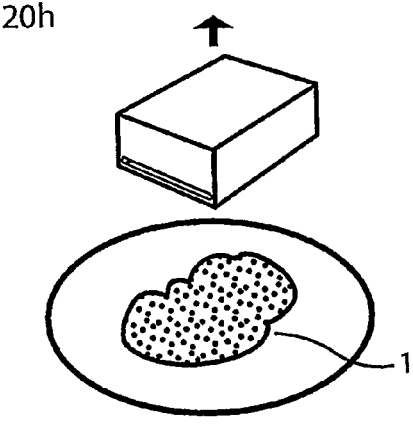
20h Fig. 21
21a 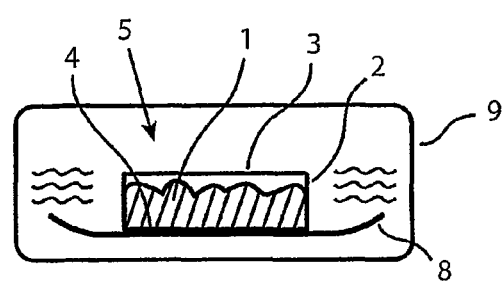
21b 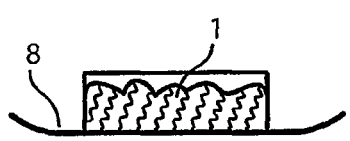
21c 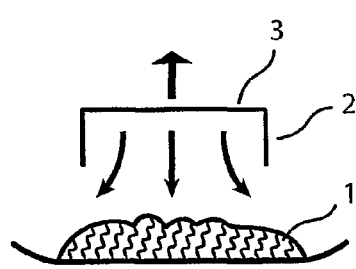

FOOD PACKAGE AND METHOD FOR TRANSFER OF FOOD

RELATED APPLICATIONS

This application is a nationalization under 35 U.S.C. 371 of PCT/SE2006/000508, filed Apr. 28, 2006 and published as WO 2006/115457 A1 on Nov. 2, 2006, which claimed priority under 35 U.S.C. 119 to Sweden Patent Application Serial No. 0500948-5, filed Apr. 28, 2005, and Sweden Patent Application Serial No. 0502182-9, filed Oct. 4, 2005; which applications and publication are incorporated herein by reference and made a part hereof.

TECHNICAL FIELD

The present invention relates to a package comprising a bottom part intended to receive food thereon, and a container part where the said bottom part and the container part are intended to enclose the said food.

There is an increasingly large demand for meals that are simple to prepare and for which the preparation time is short. Sales of convenience foods in particular are increasing, which is sold in disposable packs and is either eaten directly or requires only to be heated before it is ready to be consumed.

PRIOR ART

Previously disclosed disposable packs for convenience food usually consist of a tray manufactured from cardboard, metal or a plastic material with a thin, transparent plastic film which serves as a lid. The majority of packs are manufactured with the intention that the food will be heated before it is consumed. A plurality of different methods of heating is available, although the most common is for the food to be heated in a microwave oven, in a conventional oven or by placing the package in hot water. The lid of the package is removed either before or after heating. The meal can then be eaten directly from the pack. The choice of materials can mean that the packs become moist during heating and that the packs are instable and limp and are accordingly not particularly suitable to eat from. The presentation of the meal is also not to a particularly high standard, because both paper and plastic plates impart a cheap feeling that cannot be compared to that of plates made of porcelain or other solid materials.

An alternative to eating directly from the package is to transfer the prepared meal manually to a plate. However, a method of this kind leads without exception to the contents of the package becoming mixed together in an undesired fashion, as a consequence of which the presentation of the meal is not as intended.

A common solution for keeping the various components of a meal apart is to subdivide the package into different sections with dividing walls. The disadvantage of this solution is, among other things, that the edges of the sections make it difficult to eat directly from the tray. The presentation of the meal is also impaired in this case by the fact that the packs are manufactured from a disposable material. Transferring the prepared meal to a plate without mixing the constituent parts is easier than in the case of an ordinary package that is not divided into sections, although this still calls for time-consuming work input and an impaired result. The presentation of the meal by this method depends entirely on the person who transfers the meal to the plate.

Other previously disclosed packs include the package described in WO-A1-2004/045970, which is subdivided into sections and provided with valves in order to ensure that the foods in the various sections are not subjected to high heat at different levels.

Previously disclosed in U.S. Pat. No. 3,708,086 is a package subdivided into sections where the pack, after heating, must be inverted, whereby the lid must act as a plate.

Described in EP-A1-0,760,341 is a package intended to hold the food until the time of its consumption, which comprises a container and a closure. After the food has been heated, the package is inverted and is positioned on a plate. The user then pulls out the sides of the pack, whereby the seal breaks and the contents of the container are transferred to the plate.

None of the aforementioned documents relates to a package from which food can be transferred in a simple and smooth manner to a plate or some other storage place for the food, without spoiling the presentation of the food after it reaches the plate, or without spending a lot of time and effort in order to achieve an aesthetically pleasing arrangement.

The need accordingly exists for a package which solves, among other things, the above-mentioned problems in a simple and effective manner.

DESCRIPTION OF THE INVENTION

The aforementioned object is achieved by means of a package according to the present invention, which is characterized essentially in that the package is provided with means for holding the bottom part and the container part together in a detachable manner, and with means for entirely or partially separating the said bottom part from the said container part by removing part or all of the said bottom part, with the bottom part of the package standing on a serving surface so that the food comes into contact with the serving surface, whereby the aforementioned container part is essentially retained in its position enclosing the said food. The bottom part can thus be removed from the said container part, whereby the food comes into contact with the serving surface without the said container part having to be removed.

The invention also relates to a method for transferring food from a pack, comprising a bottom part and a container part, to a storage place, which is characterized in that it includes the steps of: placing the package on top of the said storage or serving surface, and removing the said bottom part fully or partially from the said container part, whereby the food comes into contact with the serving surface without the said container part having to be removed.

Preferred or advantageous embodiments are set forth in the characterizing parts of the associated subordinate Claims.

BRIEF DESCRIPTION OF THE FIGURES

The invention is described below in a non-restrictive fashion with reference to a number of preferred illustrative embodiments, whereby reference is made to the accompanying drawings, in which FIG. 3 shows cross-sectional views of the transfer from the package to the plate followed by heating of the food with the bottom part of the package removed, FIG. 4 shows how a container part is separated from a rigid bottom part according to a preferred embodiment, FIG. 6 shows how a flexible bottom part according to FIG. 5 can be removed from a container part, FIG. 7 shows cross-sectional views of the transfer from a package subdivided into compartments to a plate, FIG. 9 shows how a number of different subsidiary packages according to the invention can be set up next to one another and their contents are then transferred to a plate, FIG. 10 shows different schematic alternative arrangements of subsidiary packs, FIG. 12 shows a package of food situated at separate levels and its transfer from the package to the plate, FIG. 13 shows an exploded view of a package according to FIG. 12, FIG. 15 shows different alternative polygonal embodiments of packages, FIG. 16 shows an alternative embodiment of a package in which the bottom part remains attached to the container part after the food has been transferred to a serving surface, FIG. 18 shows an alternative embodiment of a package with a bottom part consisting of two flexible parts for the same compartment, FIG. 19 shows a package, in which the bottom part and the container part of the package are rotatable in relation to one another, FIG. 20 shows a reusable package, and FIG. 21, finally, shows a package in which the bottom part of the package is so arranged as to melt during heating.

DETAILED DESCRIPTION OF THE INVENTION

A more detailed description of the respective Figures follows below.

Figure 1:
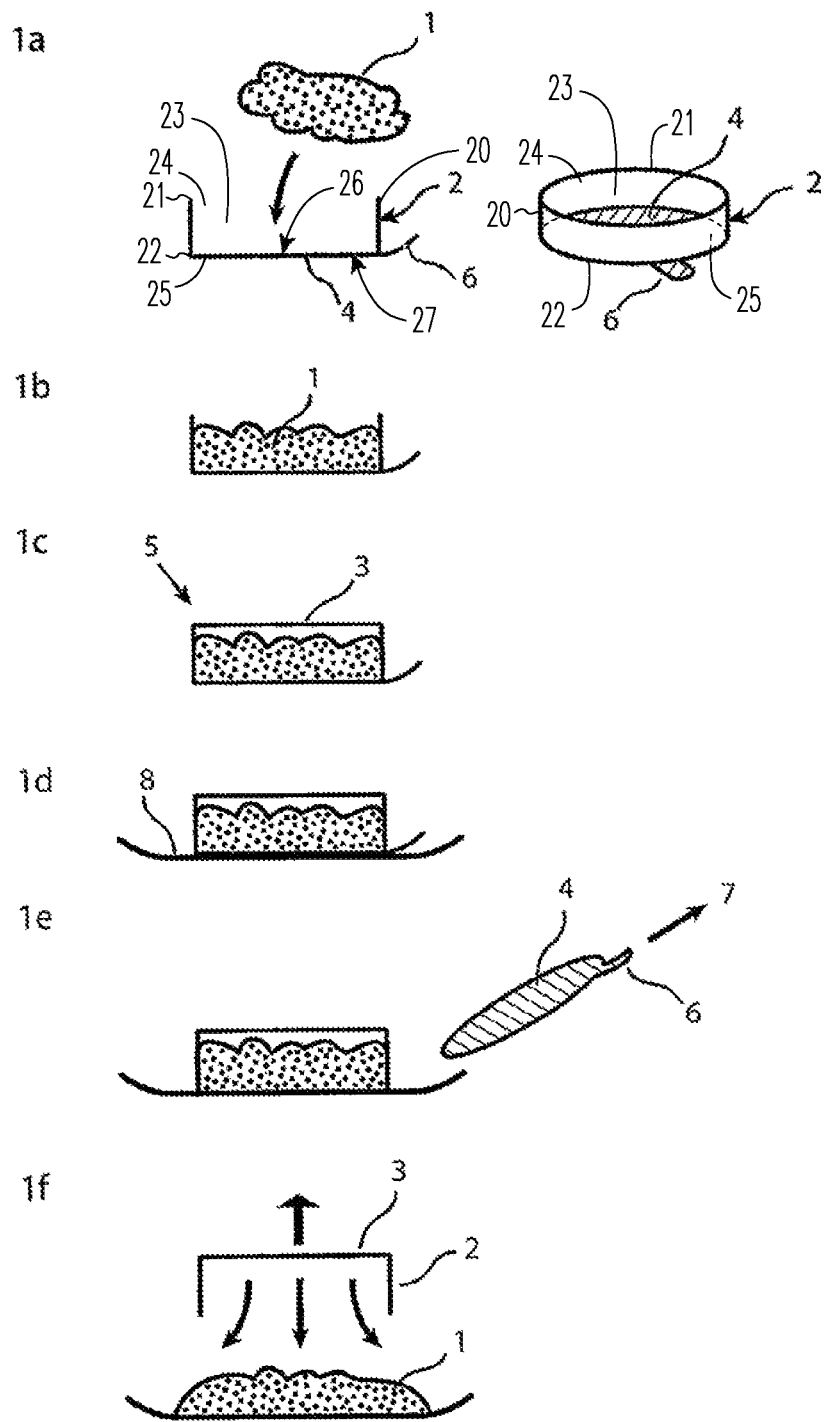
FIG. 1 shows cross-sectional views of the packaging of food and its transfer from the package to the plate.

FIG. 1 shows, as the subsidiary steps 1a-1f, different stages through which the food 1 according to the invention passes. The food 1 is packaged according to FIGS. 1a-1b in a container 2 joined together with a removable bottom 4. In various embodiments, the container 2 includes a container part that includes a wall 20 having a substantially tubular shape, the wall 20 including an underside 22 at a first end of the tubular shape, and including a upper side 21 at a second end of the tubular shape, the second end at an opposite end of the tubular shaped wall relative to the first end, the wall 20 partially enclosing an interior space 23 within the container 2, the first end including a first opening 25 leading to the interior space 23 through the underside 22 of the container part, and the second end including a second opening 24 leading to the interior space 23 through the upper side 21 of the container part. In various embodiments, the removable bottom part includes a first side 26 that faces the interior space 23, and a second side 27 that faces away from both the container part 2 and the interior space 23. A lid 3 according to FIG. 1c is then applied so that these components 2-4 together form the package 5, which contains the said food. The package is then transferred to a serving surface 8, which can be a plate or some other suitable serving surface, for example, according to 1d. The food can then be presented on this serving surface before it is consumed by removing the bottom 4 of the package 5. The bottom 4 is removed by taking hold of a gripping device 6 attached to the bottom 4 and by then pulling the said bottom 4 away 7 sideways according to FIG. 1e, so that the food is placed on the serving surface 8. After removal of the bottom 4, the container 2 with its lid 3 can be lifted vertically from the serving surface 8 according to FIG. 1f without affecting the presentation of the said food. When the food is transferred from the package 5 to the separate serving surface 8, the food is not moved vertically or horizontally to any significant extent, which means that the food can be presented on a serving surface 8 precisely in the manner intended for the packaged food.

The bottom part of the package is thus preferably intended to serve as a receptacle for the food situated on it at the time of packaging and until the time at which the food will be heated or consumed. By removing the bottom part fully or partially, the food will come into contact with the serving surface without the container part having to be removed. At the time of removal, the bottom part of the package is in a position essentially parallel to a serving surface. The bottom part is then preferably in a horizontal position and is arranged against a serving surface, which is preferably also arranged in a horizontal position. The package preferably rests on the serving surface throughout the entire procedure of removing the bottom part. A force is applied with advantage to the container part in a direction opposite to the direction in which the bottom part is pulled away 7 in order to prevent movements in the lateral sense or the vertical sense of a kind which could detract from the aesthetically pleasing arrangement of the food. Gripping devices 6 can also be arranged on the container part 2 in order to facilitate separation of the bottom part. The container part thus does not essentially need to be moved from its position in order to bring about the transfer of the food to the serving surface. A certain lateral movement can be performed, however, and in particular if the serving surface is fully or essentially plane and does not exhibit any edges, it is also conceivable for the container part to be capable of being displaced in the lateral sense. The bottom part and the container part must be displaced relative to one another, however. The container part is preferably manufactured from cardboard, metal or a plastic material.

Figure 2:
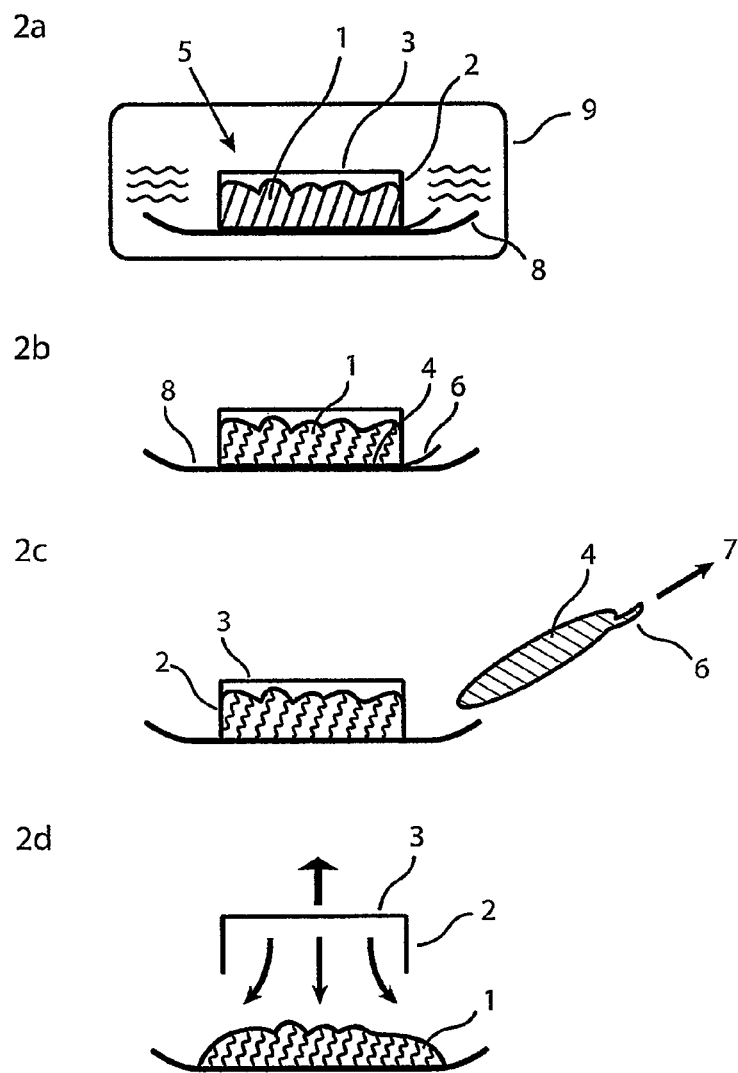
FIG. 2 shows cross-sectional views of the heating of food in a package and its transfer from the package to the plate.

FIG. 2 shows, as the subsidiary steps 2a-2d, a method according to the invention for the purpose, after heating food 1 in an oven 9 or the like, contained in the package 5, of transferring the said food to a plate or some other suitable serving surface 8. The food can then be presented on this plate or other serving surface 8 before it is consumed by placing the package with the food according to FIG. 2b on top of the serving surface 8, after which the bottom 4 of the package is removed according to FIG. 2c, so that the said food is placed on the plate 8 without the food being moved vertically or horizontally to any significant extent, and so that the container 2 with its lid 3 can be lifted vertically from the plate 8 according to FIG. 2d without the presentation of the said food being impaired. The advantages of this method are, among other things, that the bottom part 4 does not need to be folded and can be of rigid execution as a result, and that the food is hot after heating and accordingly exhibits low friction at rest, and as such slides easily from its base 4 and the container 2. The package in this embodiment may preferably be provided with one or more valves in order to avoid overpressure inside the package during heating. The container part 2 and the lid 3 are manufactured as a single piece in this embodiment, although it is naturally also possible to make these in two separate pieces. The lid can also be manufactured from a different material, for example a thin plastic film, which affords the possibility of observing the presentation of the food before use. The lid can also be embodied so that the lid can be removed.

FIG. 3 shows, as the subsidiary steps 3a-3d, a method according to the invention for the purpose, before heating food 1 contained in the package 5, of transferring the said food to a plate or some other suitable serving surface 8. The food can then be presented on this serving surface before it is consumed by placing the package with the food according to FIG. 3a on top of the serving surface, after which the bottom 4 of the package is removed according to FIG. 3b, so that the said food is placed on the serving service without the food being moved vertically or horizontally. The food is then heated in an appropriate fashion, for example in an oven 9 according to FIG. 3c and is removed from the said oven, after which the container with its lid can be lifted vertically from the plate 8 according to FIG. 3d without the presentation of the said food being impaired in any way. The circumstance can naturally arise in which those parts of the food that have been in contact with the inside of the container 2 will be distributed over the serving surface as the container is removed. There is no need to provide the package with valves in this embodiment, because no overpressure is generated. The bottom part can be made flexible, on the other hand, to facilitate its removal, or it may have a surface with low friction, for example Teflon.

FIG. 4 shows an example of how a container part 2 can be connected in a sealing fashion to a removable bottom part 4. A strip-shaped or string-shaped device with an arbitrary cross section, for example a cord 11 that is laid in the form of a loop, provides an effective closure, and a seal 10 for the cord 11 is also provided in order to seal the cord 11. Pulling 13 on the cord 11 causes the bottom 4 to be loosened from the container part 2, whereby it is easy to remove 7 the bottom part 4 sideways from the rest of the package. A loop 12 or some other gripping device is preferably attached at one end of the cord. The aforementioned strip-shaped device can have a cross section that is circular, rectangular, oval, etc., or can be a thin, flat strip or string. It need not be the cord 11 that joins the container 2 and the bottom 4 together, but this may be provided, for example, by an attachment function on the container part or by some form of adhesive, perforation or the like, which either accompanies the cord or remains in place on the container part 2 after the cord has been removed. Instead of a cord, it is possible to use sugar, a sugar solution or some other edible substance, for example, which melts when it is heated, to attach the bottom 4 and the container 2. This characteristic is particularly applicable when the bottom part must be removed after the food has been heated, for example in an oven according to the embodiment described in FIG. 2.

Figure 5:
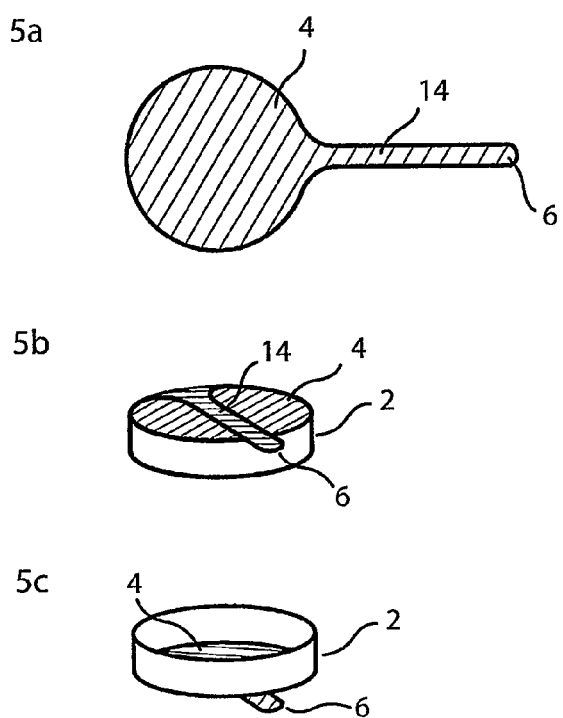
FIG. 5 shows a possible embodiment of a flexible bottom part.

FIG. 5 shows a package in which the bottom part 4 is provided by a flexible material, for example a thin plastic material. The bottom part in this embodiment is folded double with a tab 14 which extends along the entire bottom 4 of the package in order to enable the said bottom part to be removed in a simple and smooth manner before or after the package is heated. Accordingly, no additional seal between the container part and the bottom part is required in this embodiment, and these are preferably held together with the help of an adhesive. FIG. 5b shows the package with the bottom part 4 facing upwards.

FIG. 6 shows, as the subsidiary steps 6a-6c, a package 5 in which the bottom part 4 is folded double in the same way as in FIG. 5, and how the container part 2 with the associated tab 14 is removed sideways by pulling on the gripping device 6.

Figure 17:
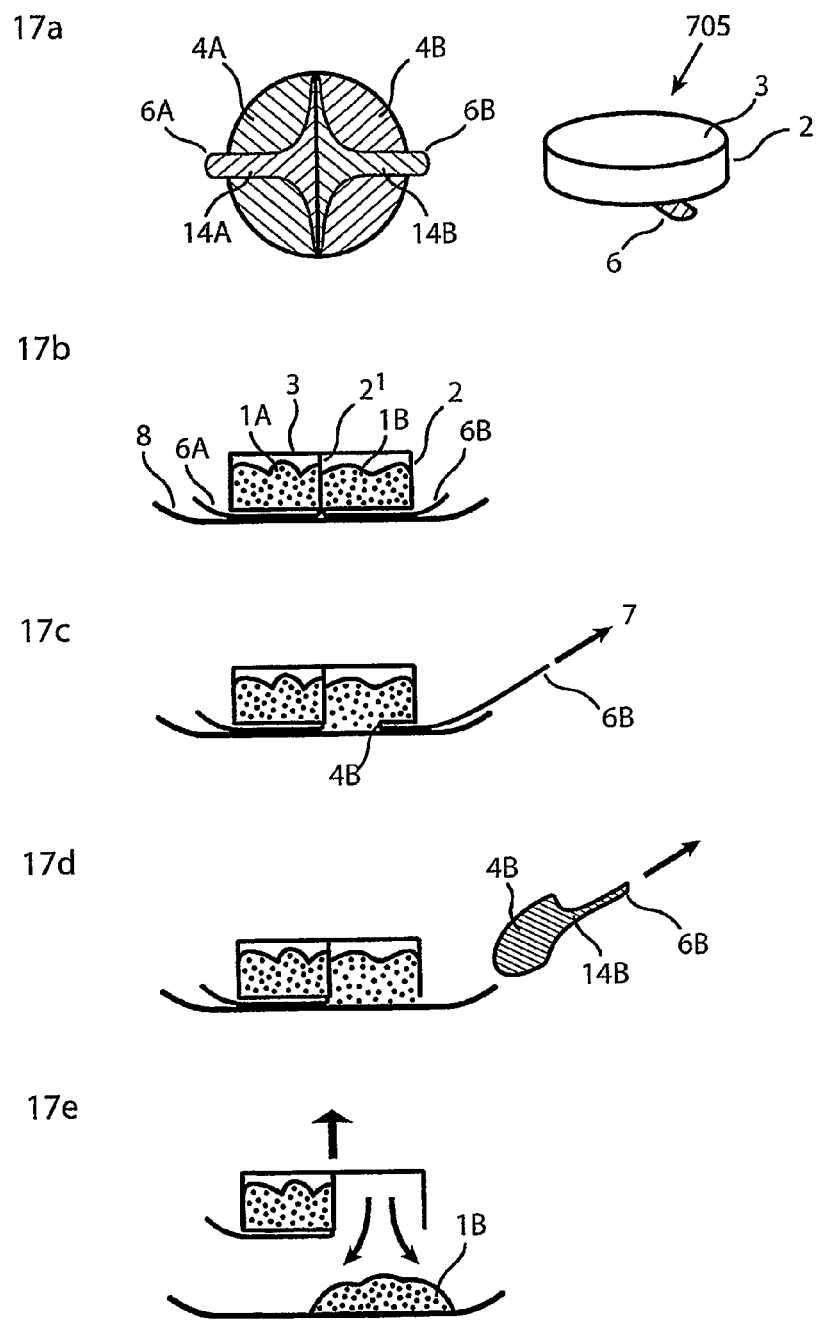
FIG. 17 shows an alternative embodiment of a package subdivided into compartments with a bottom part consisting of a number of flexible parts, one for each compartment.

FIG. 7 shows a package 105 with different compartments 105A-C. The different compartments are separated by walls $2^{1,2}$. When pulling away 7 the bottom 4 according to FIG. 7c, the foods 101B and 101C in the different compartments are retained in the desired positions thanks to the separating walls $2^{1,2}$ of the container part. By subdividing the package into containers in this way, different parts of the food 1A-C can be placed in a desired location on a serving surface 8, according to FIGS. 7d-e. As illustrated in FIG. 17, each compartment can also be attached to a separate part of the bottom part, which only constitutes the bottom of the specific compartment. In this way, a user can choose only to transfer selected parts of the content of a package onto a serving surface.

Figure 8:
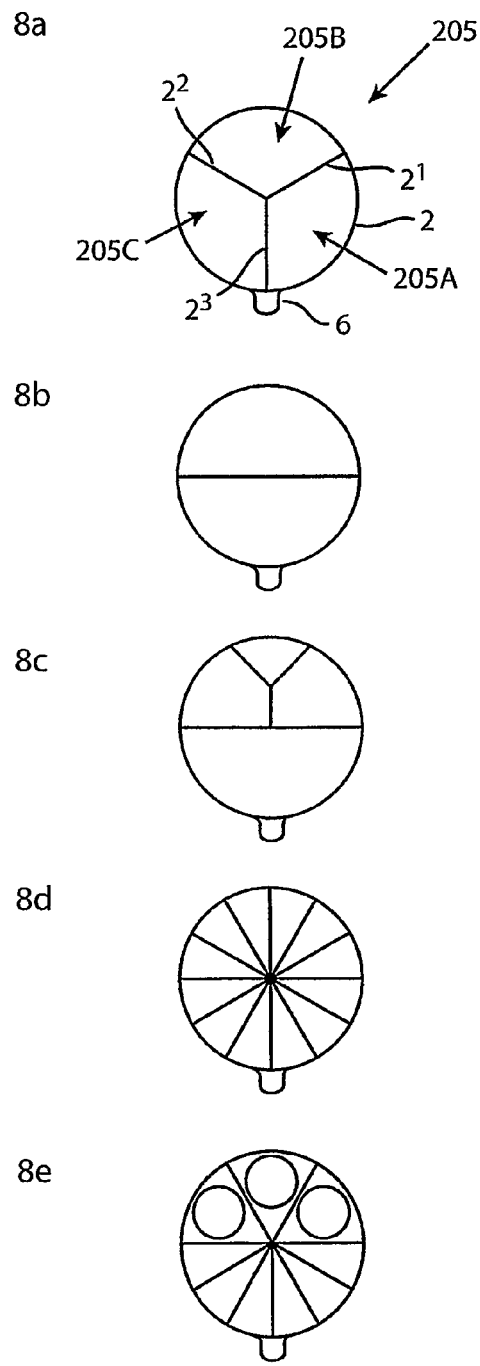
FIG. 8 shows schematic representations of packages subdivided into compartments.

FIG. 8 shows different schematic variants of the subdivision of packages 205 into compartments. The number of compartments 205A-C, separated by walls $2^{1,2,3}$, is arbitrary and can vary from a single compartment in the basic embodiment up to ten or more different compartments, if desired. Illustrated in FIG. 8d, for example, is an embodiment with a cheese board, which requires a large number of compartments in order to achieve a desired presentation.

FIG. 9 shows how different subsidiary packages 305A-C can be handled and set up to form a common package 305 containing different dishes 1A-C, which together form a complete meal, and which are received on a common serving surface 8. The bottom parts 4A-C of the schematic example of subsidiary packages 305A-C are pulled away sideways 7A-C according to FIG. 9b, for example in an oven 9, before, after or without heating. The upper parts 2A-C, 3A-C of the package 305 are then removed, after which the meal can be presented with the contents 1A-C of the different subsidiary packages 305A-C in the desired location on the serving surface 8 according to FIG. 9d.

FIGS. 10a-10e show different schematic alternatives of the embodiment of subsidiary packs 305D-F that have been placed adjacent to one another and thereby form a common package 305 containing a complete meal. In this way, the user can choose for himself/herself the components of his meal by combining different subsidiary packages with the desired content.

Figure 11:
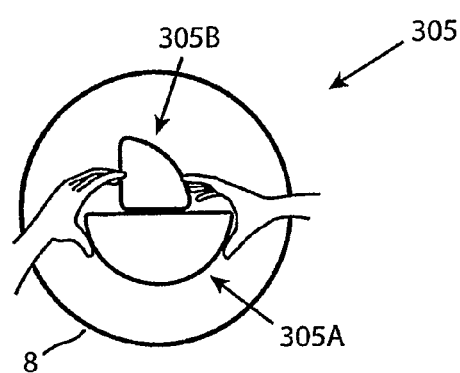
FIG. 11 shows examples of how different subsidiary packages can be arranged over and above the intended combinations.

FIG. 11 shows that it is also possible for the user to combine and, according to the method described in FIG. 9, to use a number of subsidiary packages 305A-B, which, when placed adjacent to one another, do not form a package 305 with a circular, oval, superelliptical or polygonal outer edge.

Figure 14:
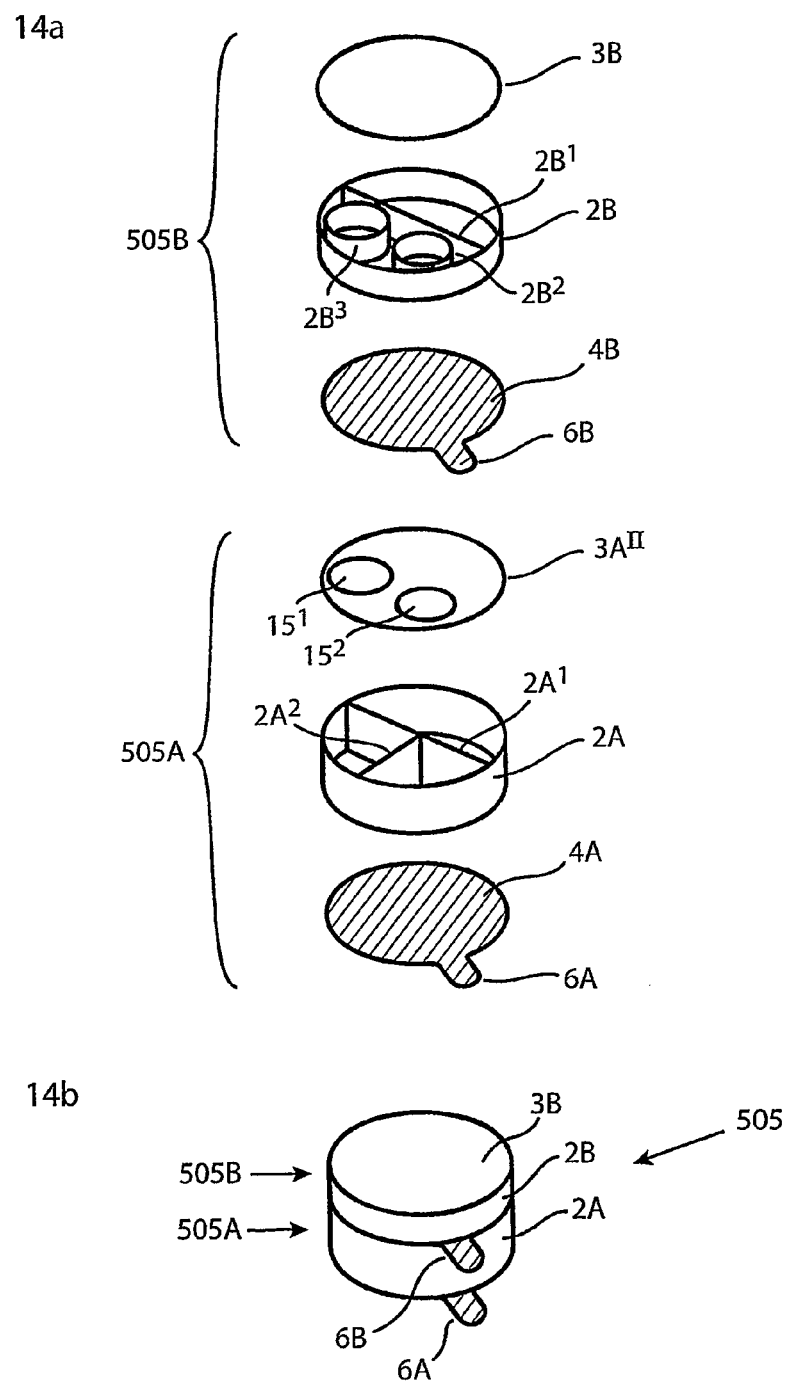
FIG. 14 shows an exploded view of an alternative package according to FIG. 12.

FIGS. 12-14 show examples of foods 1A-B situated at separate levels. For example, a sauce 1B can be contained in an upper package 405B, while other food 1A is contained in a lower package 405A. The different subsidiary packages 405A-B can be manufactured from different thermally insulating or heat-transmitting materials depending on the degree to which it is wished for the contents of the various subsidiary packages to be heated. A subsidiary package which contains a sauce that must be cold, for example, may be manufactured from a thermally insulating material, for example, whereas a subsidiary package which contains food that must be heated is manufactured from a heat-transmitting material.

As can be appreciated from the various subordinate stages 12a-12e, the entire package 405 consisting of the subsidiary packages 405A-B is placed on a common serving surface 8. Before or after the package and its contents are heated in an oven or similar 9, the lower bottom 4A is appropriately pulled away 7A, whereupon the contents of the lower package 405A end up on the plate 8. Subsequently, the upper bottom part 4B is pulled away so that hot or cold sauce 1B or some other form of food runs down or flows down over or next to the subjacent hot food 1A located on the plate 8. The pile of container parts 2A-B and their associated lids 3A-B is then removed. More levels than the two levels illustrated here are naturally possible. These can be situated directly above one another or can be displaced laterally in relation one another.

The packages 405A-B can be manufactured as a single piece or can be formed with the help of two or more separate packages that can be combined together. If the package is manufactured in single piece, the subsidiary packages are separated only by the bottom part 4B of the upper subsidiary package 405B. If it is formed with the help of two separate packages that have been combined, the bottom part 4B of the upper subsidiary package 405B must be adapted in respect of its size to a hole 15 in the subjacent upper part 3A, according to FIG. 13a, which is covered by a detachable upper part of the lower subsidiary package 405A. In this embodiment, both the upper part of the lower subsidiary package 405A and the bottom part 4B of the upper subsidiary package 405B must be removed in order to cause the contents of the various subsidiary packages to come into contact with one another. Either the upper part of the lower subsidiary package 405A is removed before the upper subsidiary package 405B is connected to the lower subsidiary package 405A, or the upper part and the bottom part are removed simultaneously.

In an alternative embodiment, one or more bottom parts 4 of subsidiary packages can consist of an edible layer which melts when it is heated up. The layer preferably melts once a desired level of heat has been achieved in the subsidiary package or in an adjacent subsidiary package. For example, the layer may be constructed in such a way that it melts precisely when the contents of a subjacent subsidiary package have been heated to such an extent that the content is cooked and ready to eat, and the contents of a superjacent package then drop down over the contents of the subjacent subsidiary package. This can be achieved by selecting layers having a thickness and a material that are adapted for the preparation time of the contents of the subjacent subsidiary package. If the bottom part that is so arranged as to rest on the serving surface 8 consists of a meltable layer, see also FIG. 21, this should be protected from the surroundings during the period of storage of the package by some form of protective layer, for example a plastic film or similar, in conjunction with the meltable layer, which can then be removed from the package before heating or transferring the food. This protective layer can with advantage also consist of or can be supplemented by a hard material, which also protects the meltable layer from impacts and the like. The meltable layer is preferably tasteless and edible, and is so arranged as to be dissolved in its entirety when the layer is heated. In this embodiment, the bottom part is held together with the container part by the fact that the constitution of the bottom part causes the bottom part to be attached to the container part, or alternatively thanks to the presence of a removable device 11 or an adhesive.

FIG. 13 shows an exploded view of the stacked package 405 described in FIG. 12. An upper part 3A, of the subjacent container 405A exhibits an appropriate hole or an opening 15 in order to permit superjacent food 1B to pass through the said hole 15 in conjunction with the removal of the bottom 4B of a superjacent package 405B. Gripping devices 6A-B are so arranged as to project for a short distance from the rest of the package in order to be readily accessible. The gripping devices preferably consist of a tab of a convenient size for gripping. As an alternative, the gripping device can extend around the entire package or parts thereof. The gripping device can be embodied as a ring or a ball or can be of some other appropriate construction.

FIG. 14 shows an exploded view of a package 505 in two planes consisting of subsidiary packages 505A-B, in which smaller internal containers $2B^{2-3}$ in the subsidiary package 505B are received and secured between an outer container 2B and an inner wall $2B^I$. The function of this is similar to that described in FIGS. 12-13. If the food in the upper subsidiary package 505B consists of a liquid substance, the mechanism or the means that opens the bottom part 4B of the upper subsidiary package can also be a zip fastener arrangement or similar.

FIG. 15 shows different alternative polygonal embodiments of the package 605.

FIG. 16 shows, as the subsidiary steps 16a-16d, a method according to the invention for the purpose, before, after, during or without heating of the food 1 contained in the package 5, of transferring the said food to a plate or some other appropriate serving surface 8, essentially in the same way as in FIGS. 1,2,3 and 6. The only difference is that the bottom part 4 is not removed in its entirety from its attachment to the periphery of the under side of the container part 2. The bottom part thus does not require to be separated in its entirety from the container, but only to such an extent that a desired quantity of the food comes into contact with the subjacent serving surface. In this way, the whole package can be disposed of in its entirety after the food has been transferred from the package to the serving surface. For example, that part of the bottom part 4 that is intended to remain on the container part 2, including after the package has been used, can be provided with stronger adhesive or a larger quantity of adhesive in order to prevent removal of the whole of the bottom part. It is also possible to envisage that the said part is securely glued or welded to the container part.

FIG. 17 shows a package in which the bottom part 4 consists of two or more parts that are folded double. The subsidiary steps 17a-17e show how a part 1B of the food 1 in the package 705 is transferred to a serving surface 8. The bottom part in this embodiment is folded double in the same way as in FIGS. 5 and 6, for example, with the difference that the bottom part 4 consists of several different double-folded parts 4A-B. On the under side of the package, the different parts can be attached to one another along a line or at a given point. The different parts also need not be attached to one another on the under side, but can instead be connected to, for example, the under side of a wall 21 which divides the package into different compartments. However, the attachment or the connection preferably takes the form of perforations along the one or more lines where the part that is to be removed from the package is folded double, that is to say where it is transformed from being a part on which the food is stored into a tab 14 which never needs to come into contact with the food. If necessary, the said connection between the different parts of the bottom part, or between the bottom part and the container part, can be in the form of a cord or similar, which must be removed before the parts can be separated. It is also possible to design a package consisting of a number of compartments in such a way that the bottom parts of certain compartments are manufactured from a flexible material, while the bottom parts of other compartments are manufactured from a rigid material, a meltable material or a rotatable and rigid material.

FIG. 18 shows a package 805 in which the bottom part 4 consists of two or more flexible parts that are folded double. The subsidiary steps 18a-18e show how the food 1 in the package is transferred to a serving surface 8. A tab 14A or similar belonging to a part 4A of the bottom part 4 extends around the edges and the lid of the package in order to converge on the upper side of the package with other tabs 14B belonging to other parts 4B of the bottom part 4, forming gripping devices 6A-B. The flaps 14A-B preferably meet at a centrally located point on the upper side of the package. For example, the tabs can sit securely in a loop in order to facilitate the pulling away of the bottom part. The attachment between the different parts of the bottom part can, precisely as in FIG. 17, be in the form of sections of perforations, removable string-shaped or strip-shaped devices, some uniting edible substance which melts in conjunction with heating, or else the different parts can be attached to the under side of a wall that divides the package into different compartments. The method of removing a bottom part 4 is performed by taking hold of the gripping devices 6A-B that are present on the upper side of the package and drawing these upwards in the vertical sense. The different parts of the bottom part 4 will then be displaced laterally 7A-B on the under side of the package, whereby the food will be placed on a serving surface 8 under the package 1. The package is raised in steps 18d and 18e and is separated from the food and the serving surface. The bottom parts 4A-B can either be left in place at this point on a part of the container part 2 or can be removed from it.

FIG. 19 shows, as the subsidiary steps 19a-19c, an alternative method according to the invention for the purpose of transferring food from a package 905 to a serving surface 8. In this embodiment, the bottom part 4 and the container part 2 of the package are rotatable in relation to one another. The bottom part 4 is rotatably attached to a device 16 that is connected to the container part 2. By taking hold of a gripping device 6 arranged on the bottom part, this can be drawn sideways 7 according to stage 19b, whereby the bottom part can rotate about the attachment point of the device to the container part, and the food that is present inside the package can, according to stage 19c, be transferred to a serving surface 8. The device 16 is preferably arranged perpendicularly in relation to the bottom part. The package can also be subdivided into compartments and can consist of a plurality of devices 16 attached to different parts of the bottom part, so that only the food that is present in a particular compartment, for example, is transferred to the serving surface when the bottom part 4 rotates about the device 16. This embodiment can be combined with advantage with a string-shaped or strip-shaped device 11, which facilitates the separation between the container and the bottom as shown in FIG. 4.

FIG. 20 shows an alternative package 1005 according to the present invention. The subsidiary steps 20a-20h shows an example of how the package can be used for the transfer of food 1 to a serving surface 8. The bottom part is fitted underneath in the package, as shown in steps 20a-c. In order to facilitate fitting and removal of the bottom part, it is preferably arranged in grooves 17 that are arranged internally in the sides of the container part 2, and are preferably situated as low as possible. The grooves can consist of rectangular depressions, for example. The bottom part should be manufactured from a rigid material so that it can be pulled along the groove without any problem for the whole of its length. Some form of sealing device should be present between the bottom part and the container part to ensure that the package is sealed tightly. Steps 20d-f show how the food is arranged on the upper surface of the bottom part with a positioning of the food which conforms to the desired final appearance that the meal must possess on the serving surface before it is consumed. A lid 3 can be applied on the edges of the container part, whereby the package is ready to be transported to a serving surface for presentation or heated for subsequent transport. Steps 20g-h show how the bottom part is removed and the food is transferred to the base before proceeding to remove the container part and the lid, if it is still present. In order to prevent overpressure and to facilitate the subsequent removal of the bottom part, the lid should be removed if the food is intended to be transferred to the serving surface after heating. The parts of the package can possibly be cleaned after use ready for subsequent reuse, or they can be sent for recycling. The package in accordance with this embodiment is particularly suitable for those occasions on which a meal needs to be transported before it is consumed and it is wished to retain the aesthetic appearance of the meal.

The above-mentioned grooves can also be arranged on the outside of the container part. The bottom part in this case must, on two opposing sides, extend around the bottom edges of the container part in order to engage in the external grooves, which may either be in the form of protuberances or depressions on the edges. In the event that the package will be reused, this embodiment is easier to keep clean than the embodiment with the internal grooves. The grooves are longitudinal with advantage, although they can also be in the form of supporting points arranged at a distance from one another.

FIG. 21, finally, shows a package according to an alternative embodiment in accordance with the present invention, in which the bottom part of the package is so arranged as to melt during heating. Step 21a shows how the package 5 with a bottom part 4 made from a meltable material have been placed in an oven 9 together with a serving surface 8. In step 21b, the package has been heated, whereby the bottom part 4 has melted and the food 1 is in direct contact with the serving surface. In step 21c, the container part 2 with the lid 3 is removed vertically, whereby the food is ready to be consumed.

According to a further alternative embodiment, it is possible to envisage that the entire package consists of an edible material which melts when heated.

The invention is naturally not restricted to the embodiments described above and illustrated in the accompanying drawings. Modifications are possible, in particular with regard to the nature of the various parts, or by the use of equivalent technology, but without departing from the area of protection afforded to the invention, as defined in the Patent Claims.

The invention claimed is:

1. A package comprising:
   a container part including a wall, the wall including an underside at a first end and including an upper side at a second end, the second end at an opposite end of the wall relative to the first end, the wall partially enclosing an interior space within the container part, the first end including a first opening leading to the interior space through the underside of the container part, and the second end including a second opening leading to the interior space through the upper side of the container part; and a bottom part coupled to the container part, wherein the bottom part is coupled to and closes off the first opening in the underside of the container part to form a container for enclosing a serving of food, where the bottom part is attached to a periphery of the underside of the container part in a detachable fashion, the bottom part including interior space, and a second side that faces away from both the container part and the interior space, wherein the second opening operable to receive the serving of food through the second opening so that the serving of food is received on the first side of the bottom part facing the interior space so that the serving of food is at least partially enclosed within the interior space by the container part and the bottom part, the second opening operable to be closed by a lid attached to the second end of the wall in a non-removable manner after the serving of food is received through the second opening;

wherein the bottom part includes a tab, the tab operable to allow separation of the bottom part from the container part, wherein the second side of the bottom part operable to be placed on a serving surface so that the second side is at least partially in contact with the serving surface and so that the container part is separated from the serving surface by the bottom part, and wherein the bottom part operable to be placed on the serving surface so that the periphery of the underside of the container is adjacent to the serving surface and separated from the serving surface by the bottom part, and wherein the bottom part is operable to be removed from between the container part and the serving surface using the tab, wherein removal of the bottom part in a direction along the serving surface with the second side in at least partial contact with the serving surface is operable to transfer the serving of food onto the serving surface through the first opening in the underside of the container part without substantial movement of the container part and without substantial horizontal or vertical movement of the serving of food so that the serving of food comes into contact with the serving surface, and wherein the container part is operable to be lifted vertically from the serving surface without affecting the presentation of the serving of food.

2. A package according to claim 1, wherein the tab is provided with a gripping device attached to the bottom part to permit the lateral removal of a part of or the entirety of the bottom part.

3. A package according to claim 1, wherein the bottom part consists of two or more parts, where the two or more parts are flexible and folded double.

4. A package according to claim 1, wherein the bottom part is attached to the periphery of the underside of the container part by a layer, the layer operable to melt in conjunction with heating, thereby facilitating the separation of the bottom of the part from the container part.

5. A package according to claim 1, wherein the bottom part is attached to the periphery of the underside of the container part by an adhesive.

6. A package according to claim 1, wherein the package is subdivided into at least two compartments.

7. A package according to claim 1, wherein the lid of the package includes a hole.

8. A package according to claim 7, wherein the hole is provided with a removable part.

9. A package according to claim 1, wherein the package comprises separate subsidiary packages for receiving food, of which at least certain subsidiary packages are arranged in different planes.

10. A package according to claim 6, wherein at least one compartment comprises a thermally insulating material.

11. A package according to claim 6, wherein at least one compartment comprises a heat-transmitting material.

12. A package according to claim 1, wherein the package is provided with one or more valves to prevent overpressure in the package in conjunction with heating.

13. A package according to claim 1, wherein at least one of the container part and lid comprises a flexible material which permits vacuum packing of the food.

14. A package comprising:

a container part including a wall, the wall including an underside at a first end and including an upper side at a second end, the second end at an opposite end of wall relative to the first end, the wall partially enclosing an interior space within the container part, the first end including a first opening leading to the interior space through the underside of the container part, and the second end including a second opening leading to the interior space through the upper side of the container part, the container part including a lid fixedly attached to the container part, the lid closing off the second opening of the container part; and a bottom part coupled to the container part, wherein the bottom part is coupled to and closes off the first opening in the underside of the container part to form a container for enclosing a serving of food, where the bottom part is attached to a periphery of the underside of the container part in a detachable fashion, the bottom part including a first side that faces the interior space, and a second side that faces away from both the container part and the interior space, wherein the second opening operable to receive the serving of food before the lid is fixedly attached to the container part so that the serving of food is received on the first side of the bottom part facing the container part so that the serving of food is completely enclosed by the container part that included the lid fixedly attached to the container part and the bottom part, wherein the bottom part includes a tab, the tab operable to allow separation of the bottom part from the container part, wherein the second side of the bottom part operable to be placed on a serving surface so that the second side is at least partially in contact with a serving surface and so that the container part is separated from the serving surface by the bottom part, and wherein the bottom part operable to be placed on the serving surface so that the periphery of the underside of the container is adjacent to the serving surface and separated from the serving surface by the bottom part, and wherein the bottom part is operable to be removed from between the container part and the serving surface using the tab, wherein removal of the bottom part in a direction along the serving surface with the second side in at least partial contact with the serving surface is operable to transfer the serving of food onto the serving surface through the first opening in the underside of the container part without substantial movement of the container and without substantial horizontal or vertical movement of the serving of food so that the serving of food comes into contact with the serving surface, from the serving surface without affecting the presentation of the serving of food.

15. A package according to claim 1, wherein the bottom part supports the serving of food while the serving of food is being heated.

16. A package according to claim 14, wherein the bottom part supports the serving of food while the serving of food is being heated.

\* \* \* \* \*